United States Patent

Sonohara et al.

[11] Patent Number: 5,898,794
[45] Date of Patent: Apr. 27, 1999

[54] IMAGE COMPRESSION METHOD AND IMAGE PROCESSING SYSTEM

[75] Inventors: Satoshi Sonohara; Shigeki Furuta; Hitoshi Matsumoto, all of Kawasaki; Motoyuki Morita, Tokyo, all of Japan

[73] Assignee: Fujitsu Limited, Kanagawa, Japan

[21] Appl. No.: 08/878,201

[22] Filed: Jun. 18, 1997

Related U.S. Application Data

[63] Continuation of application No. 08/140,533, Oct. 25, 1993, abandoned.

[30] Foreign Application Priority Data

Nov. 2, 1992 [JP] Japan ................................. 4-294659

[51] Int. Cl.$^6$ .......................................................... G06T 9/00
[52] U.S. Cl. ............................ 382/166; 382/236; 382/239; 348/420
[58] Field of Search ................................. 382/239, 253, 382/166, 236; 348/411, 412, 413, 404, 418, 422, 390, 420; 358/426, 524, 430; 341/51

[56] References Cited

U.S. PATENT DOCUMENTS

| | | | |
|---|---|---|---|
| 4,409,621 | 10/1983 | Richards et al. ........................ | 358/430 |
| 4,868,653 | 9/1989 | Golin et al. ............................... | 348/390 |
| 5,008,747 | 4/1991 | Carr et al. ................................. | 348/417 |
| 5,021,891 | 6/1991 | Lee .......................................... | 358/433 |
| 5,041,908 | 8/1991 | Henot ....................................... | 348/413 |
| 5,046,119 | 9/1991 | Hoffert et al. ............................ | 382/166 |
| 5,157,743 | 10/1992 | Maeda et al. ............................. | 382/248 |
| 5,163,104 | 11/1992 | Ghosh et al. .............................. | 382/240 |
| 5,166,987 | 11/1992 | Kageyama ................................ | 382/250 |
| 5,212,742 | 5/1993 | Normille et al. ......................... | 382/166 |
| 5,247,357 | 9/1993 | Israelsen .................................. | 348/417 |
| 5,267,051 | 11/1993 | Dellert et al. ............................ | 358/426 |
| 5,267,334 | 11/1993 | Normille et al. ......................... | 382/236 |
| 5,303,313 | 4/1994 | Mark et al. ............................... | 382/235 |
| 5,319,468 | 6/1994 | Honjo ...................................... | 358/426 |
| 5,341,442 | 8/1994 | Barrett .................................... | 382/166 |
| 5,376,968 | 12/1994 | Wu et al. .................................. | 348/413 |
| 5,377,018 | 12/1994 | Rafferty ................................... | 358/433 |
| 5,467,134 | 11/1995 | Laney et al. ............................. | 348/417 |
| 5,544,286 | 8/1996 | Laney ...................................... | 358/426 |

FOREIGN PATENT DOCUMENTS

| | | |
|---|---|---|
| 59-8475 | 1/1984 | Japan . |
| 60-218991 | 11/1985 | Japan . |
| 63-305672 | 12/1988 | Japan . |
| 64-82873 | 3/1989 | Japan . |
| 1-217576 | 8/1989 | Japan . |
| 1-264092 | 10/1989 | Japan . |
| 1-311786 | 12/1989 | Japan . |
| 2-73776 | 3/1990 | Japan . |

OTHER PUBLICATIONS

Interface, Aug. 1992, pp. 124–127.
ISO/IEC 11172–2:(1993)(E), 1993.
"Latest MPEG Text", Aug. 1, 1994, pp. 10–19.
IDO/IEC 11172–2:(1993)(E), 1993.

Primary Examiner—Jon Chang
Attorney, Agent, or Firm—Staas & Halsey

[57] ABSTRACT

Disclosed is an image processing system including an image input unit, an extraction unit, a plurality of compression process parts and a selection unit to compress a 1-frame image down to a less amount of color information. The image input unit takes in a plurality of frame images per frame. The extraction unit extracts each of the taken-in frame images per unit area of a designated size. The plurality of compression process parts effects compression processes different from each other with respect to pels contained in each unit area. The selection unit selects one compression process part from the plurality of compression process parts for compressing the unit area of the designated size.

19 Claims, 10 Drawing Sheets

FIG.2(a)  FIG.2(b)  FIG.2(c)
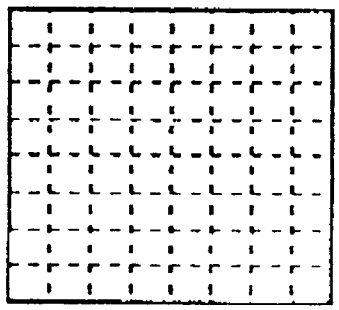 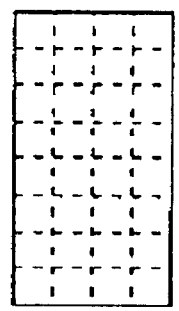 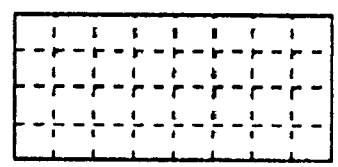
FIG.2(d)  FIG.2(e)
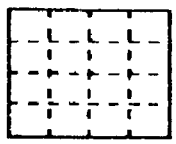 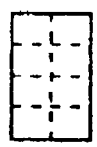

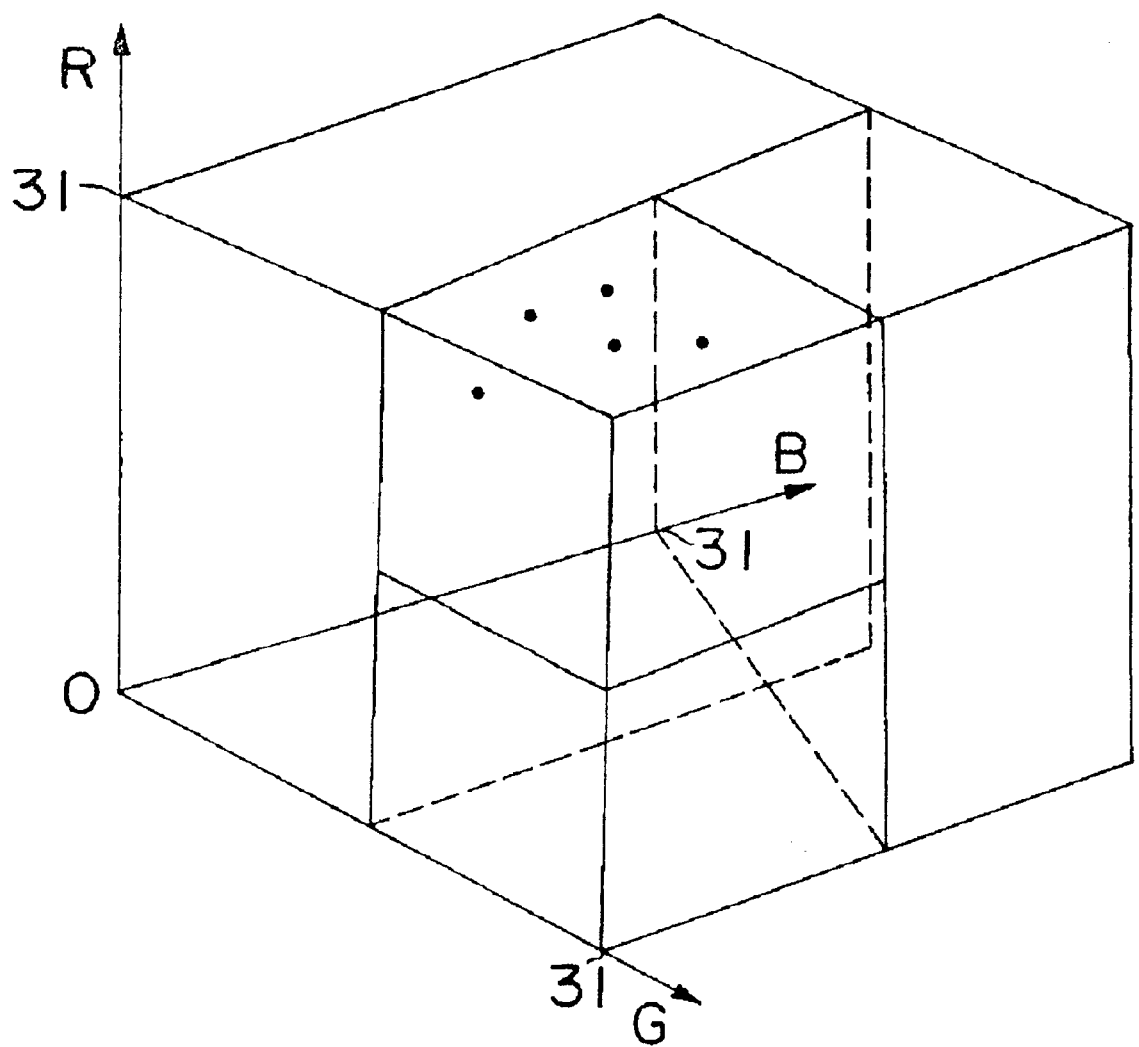

IMAGE COMPRESSION METHOD AND IMAGE PROCESSING SYSTEM

This application is a continuation of application Ser. No. 08/140,533, filed Oct. 25, 1993, now abandoned.

BACKGROUND OF THE INVENTION

1. Field of the Invention

The present invention relates to an image compression method of compressing a 1-frame image including a plurality of pels by use of different compression algorithms and to an image processing system.

2. Description of the Related Art

An image processing system includes an image input unit for inputting an image, a processing unit for analyzing and processing the inputted image and an output unit for outputting the processed image.

The image processing system effects an image compression to compress original image data down to a less amount of image data in order to process the image at a high efficiency. Note that even when compressing the image, the original image data can be, it is assumed, restored with the less amount of image data.

An image compression methods includes a method of thinning out every second or third image-forming pel. Then, the image restoring method involves copying an image adjacent to the pel thinned out on the thinned-out portion, whereby the original image is restored.

The following is also a method other than the compression method described above. The pels described above assume colors. An color expression requires several bits for color data of R (red), G (green) and B (blue) per pel. For this reason, a 1-frame image contains a considerable amount of color data.

Then, there arises a necessity for a method of compressing the color data quantity down to a less color data quantity to process the image at a good efficiency. The method of compressing the color data quantity embraces, for instance, a compression method of converting colors of all the pels contained in a certain unit area of a certain image into one representative color.

Furthermore, a variety of compression methods may be considered as a method of compressing the color data quantity. In this case, the compression method exhibiting a high compression rate of the color data quantity is demanded. The compression rate herein implies a value obtained by dividing an after-compression color data quantity by a pre-compression color data quantity with respect the pels contained in a certain unit area.

According to the conventional compression methods, however, if a certain unit area containing a plurality of pels is provided, the color data quantity of the unit area is compressed by an arbitrary method. In addition, the relevant unit area is not compressed by a compression method having the highest compression rate. The color data quantity can not therefore be compressed down to a less data quantity.

SUMMARY OF THE INVENTION

It is a primary object of the present invention, which has been devised in view of the points described above, to provide an image compression method and an image processing system for reducing an amount of color data of a 1-frame image.

The image processing system according to the present invention compresses the 1-frame image consisting of a plurality of pels each having color data of red, green and blue down to a less quantity of color data. The image processing system comprises an image input unit, an extraction unit, a plurality of compression process parts and a selection unit.

The image input unit takes in the plurality of frame images per frame. The extraction unit extracts each taken-in frame image per unit area of a designated size.

The plurality of compression process parts effect compression processes different from each other with respect to pels contained in each unit area.

The selection unit selects one compression process from the plurality of compression processes for compressing the unit area of the designated size.

Further, the extraction unit may include an area size setting unit for designating a size of the unit area for subdividing the image of the each frame into the plurality of unit areas. The selection unit may include a compression process selection part and an area change instruction part.

The compression process selection part preferentially selects the compression process part having a higher compression rate of the color data quantity from the plurality of compression process parts.

The area change instruction part instructs the area setting part to change the designated size to a smaller size to decrease the compression rate if any of the plurality of compression process parts can not compress the unit area of the designated size.

Herein, the image input means may involve an image scanner, a color TV camera and other color imaging elements.

An image compression method of this invention is actualized by the image processing system described above. According to this image compression method, the 1-frame image is compressed down to a less color dataquantity. The 1-frame image consists of a plurality of pels each having color data of red, green and blue.

The image compression method according to this invention comprises an image inputting step, an extracting step, a plurality of compression processing steps and a selecting step.

The image inputting step is to take in a plurality of frame images per frame. The extracting step is to extract the taken-in frame image per unit area of a designated size.

The plurality of compression processing steps are to effect compression processes different from each other with respect to the pels contained in each unit area.

The selecting step is to select one compression process from the plurality of compression processes for compressing the unit area of the designated size.

According to the image processing system and the image compression method of this invention, a compression process suited to compress contents of the pels in the relevant unit area is selected. The image is compressed by this compression process.

BRIEF DESCRIPTION OF THE DRAWINGS

Other objects and advantages of the present invention will become apparent during the following discussion in conjunction with the accompanying drawings, in which:

FIG. 2 (a) is a view showing example of 8 pels×8 pels of a unit area;

FIG. 2 (b) is a view showing example of 8 pels×4 pels of a unit area;

FIG. 2 (c) is a view showing example of 4 pels×8 pels of a unit area;

FIG. 2 (d) is a view showing example of 4 pels×4 pels of a unit area;

FIG. 2 (e) is a view showing example of 4 pels×2 pels of a unit area;

FIG. 3 is an explanatory view showing a monochrome block compression;

FIG. 5 (b) is a view showing example of the nonreference unit area defined by 8 pels×8 pels;

FIG. 11 (b) is a view showing pels after an incomplete subsampling compression;

FIG. 12 (b) is a view showing pels after a complete subsampling compression;

DETAILED DESCRIPTION OF THE PREFERRED EMBODIMENT

A specific embodiment of the present invention will hereinafter be described.

<Construction of the Embodiment>

Figure 1:
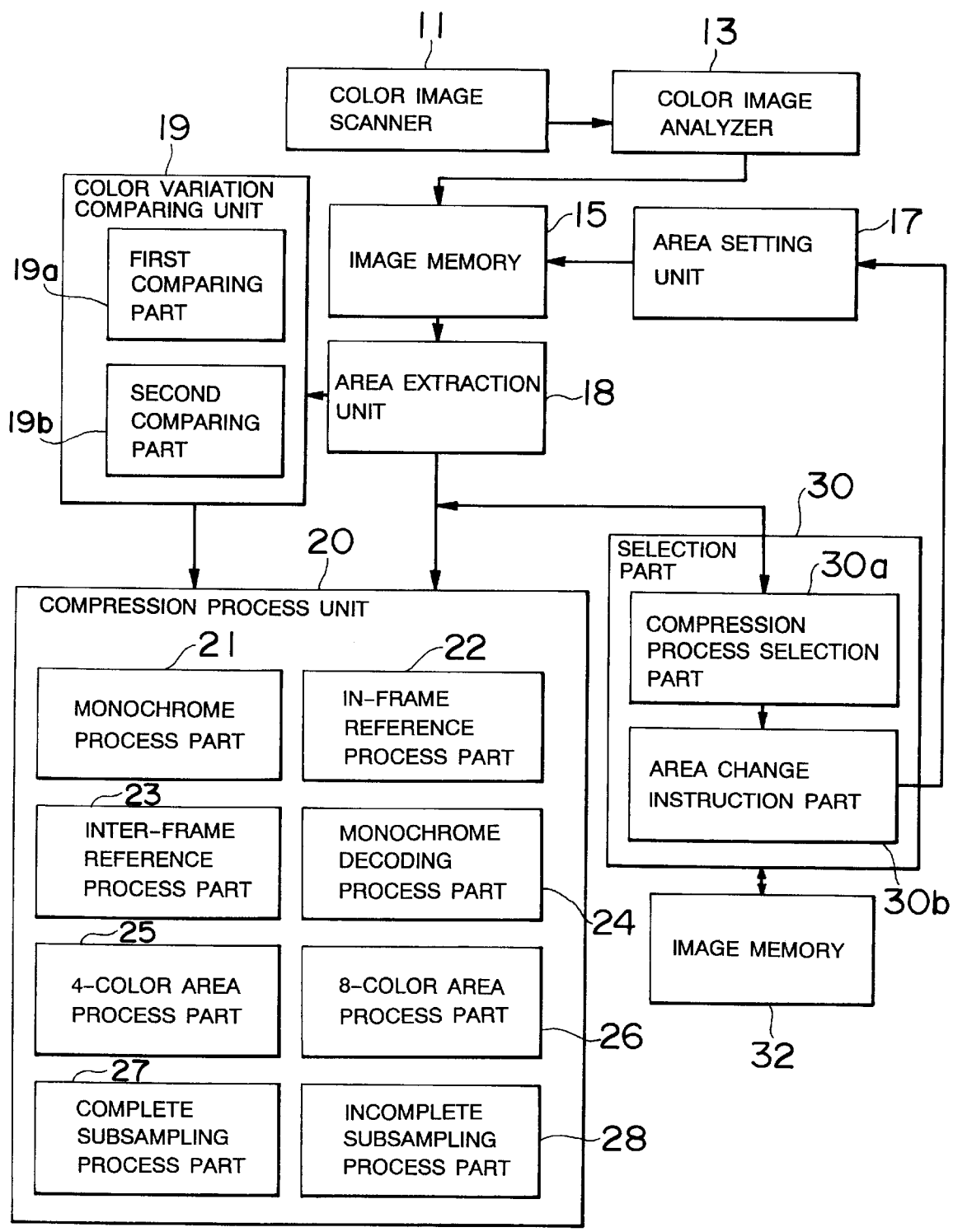
FIG. 1 is a block diagram illustrating a construction of an image processing system in accordance with an embodiment of the present invention.

FIG. 1 is a block diagram illustrating a construction of one embodiment of an image processing system to which an image compression method of this invention is applied. The following are particulars of the construction of the image processing system in the embodiment.

A color image scanner 11 reads a 1-frame image in the form of a plurality of pels. At the same time, the scanner 11 continuously reads images of a plurality of frames. A color image analyzer 13 is connected to this color image scanner 11. This color image analyzer 13 decomposes a color image per frame into items of color data of RGB (Red, Green and Blue), the color image being taken in from the color image scanner 11. Density values of the RGB color data per pel are expressed by 256 gradations. Hence a 24-bit color data quantity is needed per pel.

An image memory 15 is connected to this color image analyzer 13. This image memory 15 stores the respective density values of the 256-gradation RGB color data per pel taken in from the color image analyzer 13.

An area size setting unit 17 and an area extraction unit 18 are connected to this image memory 15. The area size setting unit 17 sets size of a unit area to subdivide one of the plurality of frame images stored in the image memory 15 into a plurality of unit areas. The image takes, for instance, sizes of 8 pels×8 pels, 4 pels×4 pels, etc.

The area extraction unit 18 extracts each of the unit areas set from the image memory 15 by size set by the area setting unit 17. FIG. 2 shows examples of the pels in the extracted unit areas. The unit areas to be extracted are 8 pels×8 pels (FIG. 2(a)), 8 pels×4 pels (FIG. 2(b)), 4 pels×8 pels (FIG. 2(c)), 4 pels×4 pels (FIG. 2(d)) and 4 pels×2 pels (FIG. 2(e)).

Connected to this area extraction unit area a color variation comparing unit 19, a compression process unit 20 and a compression process judging unit 30.

The color variation comparing unit 19 includes a first comparing part 19a for comparing colors of corresponding pels in each unit area extracted by the area extraction unit 18. The color variation comparing unit 19 also includes a second comparing part 19b for comparing a representative color with a predetermined color reference value. Note this color reference value may be inputted through, e.g., a keyboard.

Herein, the first comparing part 19a serves to compare the pel colors with each other. The first comparing part 19a calculates a value of a pel R' which corresponds to a value of a certain pel R and obtains a difference K therebetween. Note that differences between G, G' and between B, B' may be obtained. The compression process unit 20 is connected to the color variation comparing unit 19 as well as to the area extraction unit 18.

The compression process unit 20 performs a predetermined compression process with respect to each pel of the unit area extracted from the area extraction unit 18. The compression process unit is constructed of the following process parts.

<Construction of the Compression Process Unit 20>

A monochrome process part 21, if the second comparing part 19b of the color variation comparing unit 19 judges that the representative color falls within the predetermined color reference value, converts all the colors of the respective pels contained in the unit area within each frame into one representative color.

The possible-to-take unit areas are, e.g., 8 pels×8 pels, 8 pels×4 pels, 4 pels×8 pels, 4 pels×4 pels and 4 pels×2 pels. All the colors are converted into one representative color.

FIG. 3 is an explanatory view showing the monochrome compression process. In an example shown in FIG. 3, the representative color is acquired in the following manner. A certain unit area is set to 8 pels×8 pels, wherein one pel is set to 2 bytes. In rectangular coordinates shown in FIG. 3, 5 bits (0–31) are provided on an R-axis, 5 bits are given to a G-axis, 5 bits are also given to a B-axis, and 1 bit is added, whereby one pel becomes 2 bytes. 8 pels×8 pels undergo mapping on the coordinates. The unit area is, as depicted in FIG. 3, divided equally into two segments by a central value of the longest axis of a spread of distribution in an RGB space. Further, the divided unit areas are subdivided equally into four segments of unit areas by a central value of the longest axis of the spread of distribution. The representative color is acquired by further repeating the subdivision process.

The process in the monochrome process part 21 is effected based on, e.g., a monochrome process program (monochrome compression algorithm) stored in a main memory (not shown).

The first comparing part 19a of the color variation comparing unit 19 calculates a difference between a color of each pel contained in an in-frame non-reference unit area and a color of each pel in other reference unit areas within the same frame. An in-frame reference process part 22, if this difference is, it is judged, smaller than the reference value, converts the color of each pel contained in the in-frame unit area into the color of each pel contained in other unit areas within the same frame.

That is, a certain unit area is expressed in the same color as that in other unit areas within the same frame. Herein, the possible-to-take unit areas are, e.g., 8 pels×8 pels, 8 pels×4 pels, 4 pels×8 pels, 4 pels×4 pels and 4 pels×2 pels.

Figure 4:
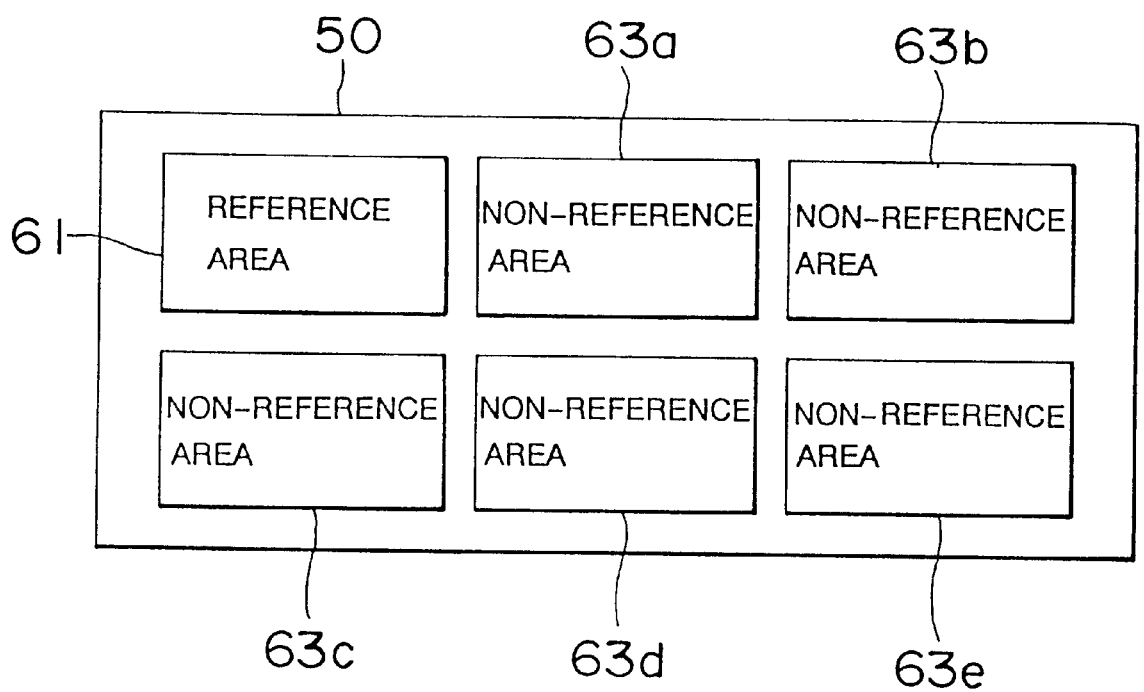
FIG. 4 is an explanatory view showing an in-frame reference compression.

FIG. 4 is an explanatory view showing a in-frame reference compression. The same frame 50 contains a reference unit area 61 and a plurality of non-reference unit areas 63a–63e. An in-frame reference process part 22 judges whether or not the same color process as that in the reference unit area 61 is possible with respect to the plurality of non-reference unit areas 63a–63e.

Note that the in-frame reference process proceeds with the non-reference unit areas 63a, 63b, 63c, 63d, 63e. With an advancement of this process, the reference unit areas increase. More specifically, the reference unit areas at which the non-reference unit area 63b aims are the unit areas 61, 63a. The reference unit areas at which the non-reference unit area 63c aims are the unit areas 61, 63a, 63b.

The process in the in-frame reference process part 22 is effected based on an in-frame reference process program (in-frame reference compression algorithm) stored in, e.g., a main memory (not shown).

Figure 5A:
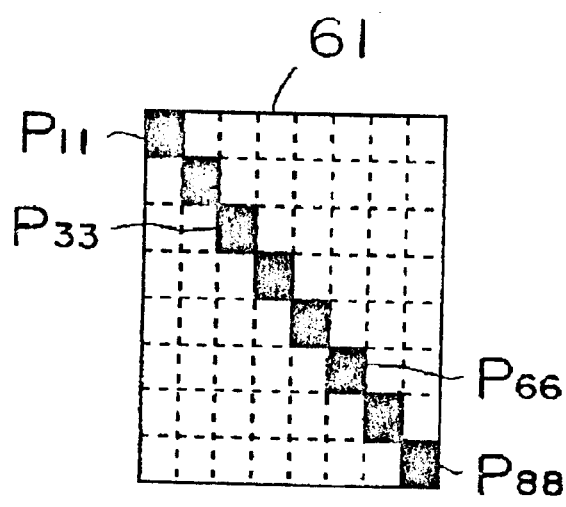
FIG. 5 (a) is a view showing example of the reference unit area defined by 8 pels×8 pels.
Figure 5B:
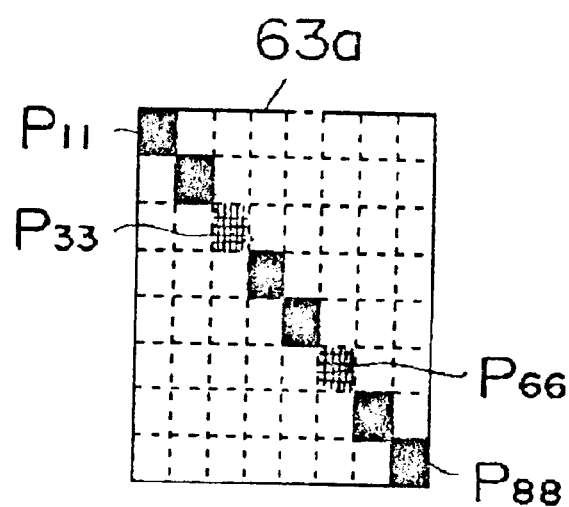

FIG. 5 shows one example of the in-frame reference compression. FIG. 5(a) illustrates the reference unit area 61 defined by 8 pels×8 pels. FIG. 5(b) illustrates the non-reference unit area 63a defined by 8 pels×8 pels. Herein, when comparing RGB of the pels in the two unit areas 61, 63, pels P11, P22, P44, P55, P77, P88 are the same. Pels P33, P66 are slightly different but fall within the reference value. The color of the non-reference unit area 63a is therefore managed in the same color as that of the reference unit area 61.

The first comparing part 19a of the color variation comparing unit 19 calculates a difference between a color of each pel contained in an in-frame non-reference unit area and a color of each pel in other reference unit areas within the same frame. An inter-frame reference process part 23, if this difference is, it is judged, smaller than the reference value, converts the color of each pel contained in a certain in-frame unit area into the color of each pel contained in other unit areas within other frames.

That is, the unit area in a certain frame is expressed in the same color as that in other unit areas within other frames. The possible-to-take unit areas are the same as those in the in-frame reference process part 22.

Figure 6:
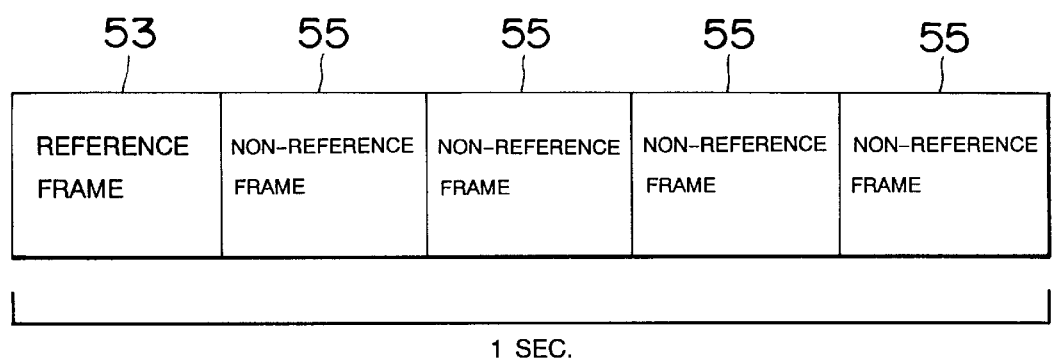
FIG. 6 is a view illustrating a layout of a reference frame.

FIG. 6 shows a layout of the reference frame. As illustrated in FIG. 6, an image for a unit time (1 sec) is configured by a top reference frame 53 and a plurality of non-reference frames 55 subsequent thereto. A plurality of thus formed frames are stored in the image memory 15.

Figure 7:
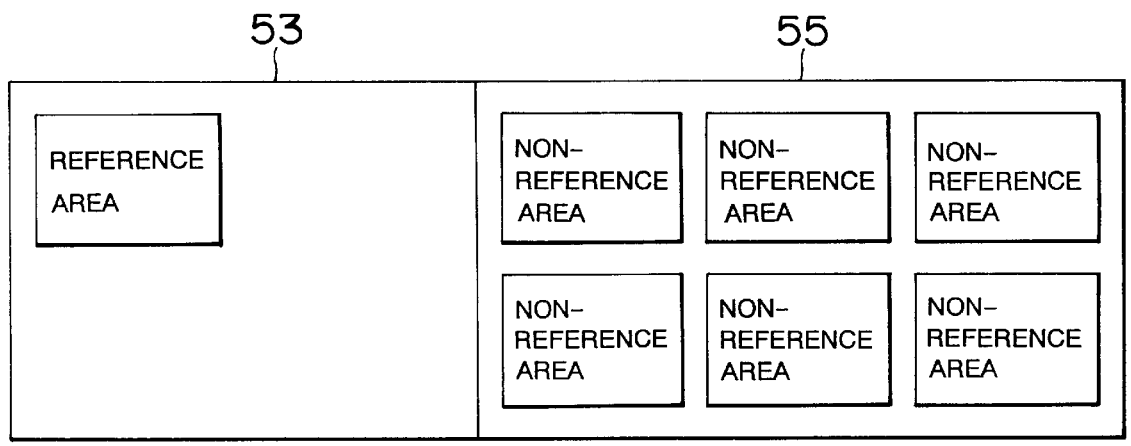
FIG. 7 is an explanatory view showing an inter-frame reference compression.

FIG. 7 is an explanatory view showing an inter-frame reference compression. In the inter-frame reference compression shown in FIG. 7, a reference unit area 61 is set in the reference frame 53. A plurality of nonreference unit areas 63a–63f are set in a non-reference frame 55. The inter-frame reference process part 23 effects the process in the same color as that in the reference unit area 61 on the basis of the result of the first comparing part 19a with respect to each of the plurality of non-reference unit areas 63a–63f. Note that the reference unit area 61 is positioned in an arbitrary location within the reference frame 53.

Herein, only one point is different; i.e., the inter-frame reference is different from the in-frame reference described above. The comparing process between the reference unit area and the non-reference unit areas is done as shown in FIG. 5.

Figure 8:
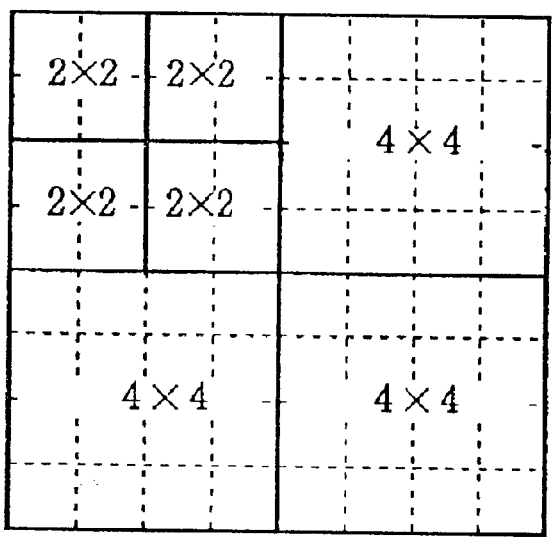
FIG. 8 is an explanatory view showing a monochrome decoding compression.

A monochrome decoding process part 24 subdivides the unit area extracted by the unit area extraction unit 18 and including a plurality of pels into a plurality of monochrome unit areas. FIG. 8 is an explanatory view showing a monochrome decode compression. In this example, the monochrome decoding process part 24 subdivides the unit area defined by 8 pels×8 pels into three segments of (4×4) unit areas and four segments of (2×2) unit areas. Each of seven subdivided unit areas is expressed in monochrome. If a partial color variation is conspicuous in the (8×8) unit area, this portion is subdivided into segments of (2×2) unit areas. This subdivision is intended for an expression in more colors.

Figure 9:
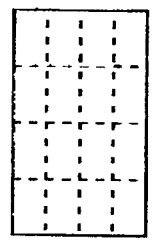
FIG. 9 is an explanatory view showing a 4-color unit area compression.

A 4-color unit area process part 25 expresses the unit area defined by 4 pels×4 pels in four colors. FIG. 9 is an explanatory view showing a 4-color unit area compression.

Figure 10:
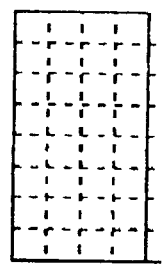
FIG. 10 is an explanatory view showing a 8-color unit area compression.

A 8-color unit area process part 26 expresses the (8×4) unit area in eight colors. FIG. 10 is an explanatory view showing a 8-color unit area division compression.

Figure 11A:
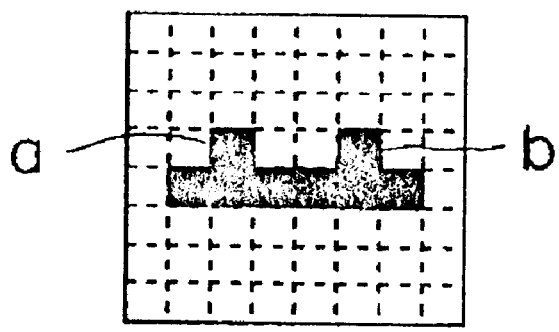
FIG. 11 (a) is a view showing pels before an incomplete subsampling compression.
Figure 11B:
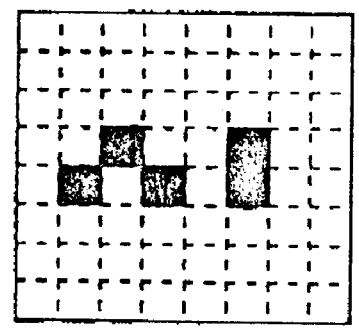

An incomplete subsampling process part 28 extracts a unit subarea where the pel color does not sharply change in the unit area. Some of the pels in this unit subarea are deleted, thereby compressing the image. FIG. 11 is an explanatory view showing an incomplete subsampling compression. In an example shown in FIG. 11(b), the incomplete subsampling process part 28, with respect to the pels shown in FIG. 11(a), leaves pels a, b exhibiting a sharp variation in color but deletes other pels alternately.

Figure 12A:
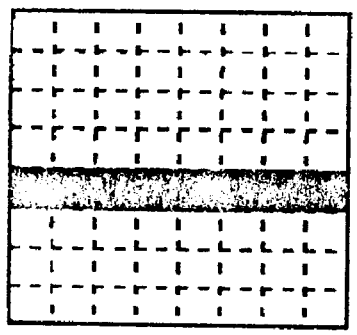
FIG. 12 (a) is a view showing pels before a complete subsampling compression.
Figure 12B:
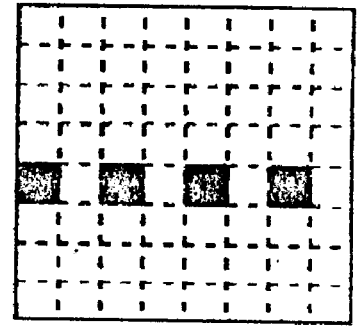

A complete subsampling process part 27 deletes the pels at a fixed interval among the pels in the unit area extracted by the unit area extraction unit 18, thereby compressing the image. FIG. 12 is an explanatory view showing a complete subsampling compression. In an example shown in FIG. 12(b), the pels depicted in FIG. 12(a) are deleted alternately;

A selection unit 30 is connected to the area extraction unit 18 and the compression process unit 20. The selection unit 30 selects a process part corresponding to the unit area from the compression process unit 20. The selection unit 30 includes a compression process selection part 30a and an area size change instruction part 30b.

Figure 14:
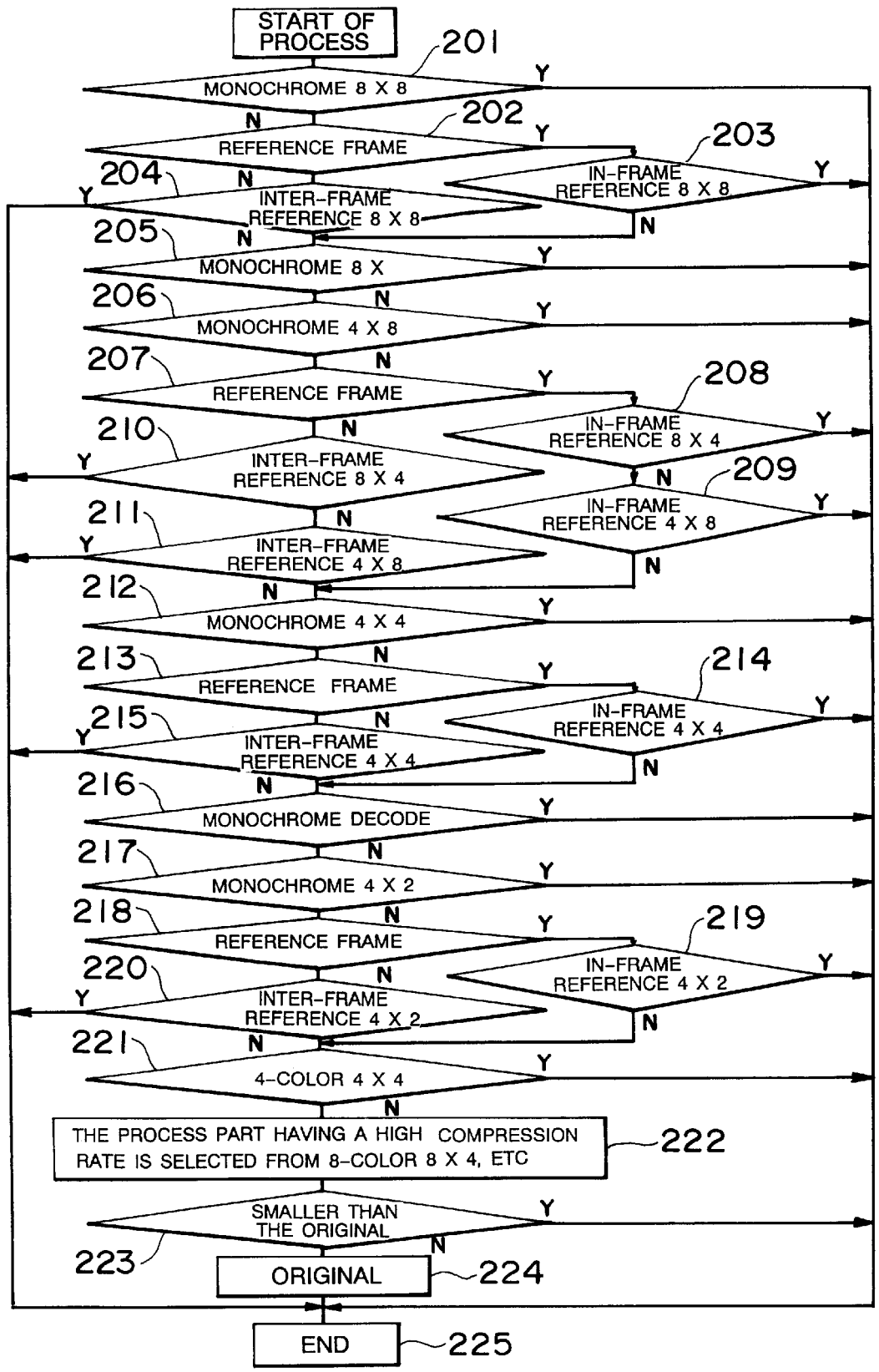
FIG. 14 is a flwochart showing selecting actions in accordance with the embodiment of this invention.

The compression process selection part 30a sequentially selects the process part having a higher image compression rate determined by a size of the unit area from the compression process unit 20 with respect to the unit area of a designated size. The area change instruction part 30b, if any of the process parts performs the conversion process for the unit areas having a designated size, gives an instruction to change the designated size to a smaller size. The selection unit 30 executes such an process with respect to the individual unit areas within the one frame. FIG. 14 is a flowchart of selecting actions by the selection unit 30.

Note that the compression rate can be defined as follows:

Compression Rate=Total Pel Number/Coded Bit Number

Further, the unit area exhibiting a high compression rate is considered to be high in terms of redundancy. An image compression rate by the compression process selection part 30a is determined by each process part in combination with the size of the unit area. The following are a number of compression processes sequenced from a higher compression rate.

(a) 1/128 Compression Process:
   monochrome 8 pels×8 pels, inter-frame reference 8 pels×8 pels, in-frame reference 8 pels×8 pels
(b) 1/64 Compression Process:
   monochrome 8 pels×4 pels, monochrome 4 pels×8 pels, inter-frame reference 8 pels×4 pels, inter-frame reference 4 pels×8 pels, in-frame reference 8 pels×4 pels, in-frame reference 4 pels×8 pels
(c) 1/32 Compression Process:
   monochrome 4 pels×4 pels, inter-frame reference 4 pels×4 pels, in-frame reference 4 pels×4 pels
(d) 1/20 Compression Process:
   monochrome decoding
(e) 1/16 compression Process:
   monochrome 4 pels×2 pels, inter-frame reference 4 pels×2 pels, in-frame reference 4 pels×2 pels
(f) 1/4 compression Process:
   4-color 4 pels×4 pels
(g) 1/3.8 Compression Process:
   incomplete subsampling, complete subsampling
(h) 1/3.2 Compression Process:
   8-color 8 pels×8 pels
(i) 1/2 Compression Process:
   original (primary colors are expressed with half of dataquantity)

An image memory 32 is connected to the selection unit 30. This image memory 32 stores contents of the compression processes by the process parts selected according to the higher compression rate with respect to the individual unit areas for one frame. Note that the image memory 32 may store processed contents for a plurality of frames.

<Operation of the Embodiment>

Next, an image compression method actualized by the thus constructed image processing system will be explained with reference to the drawings.

Figure 13:
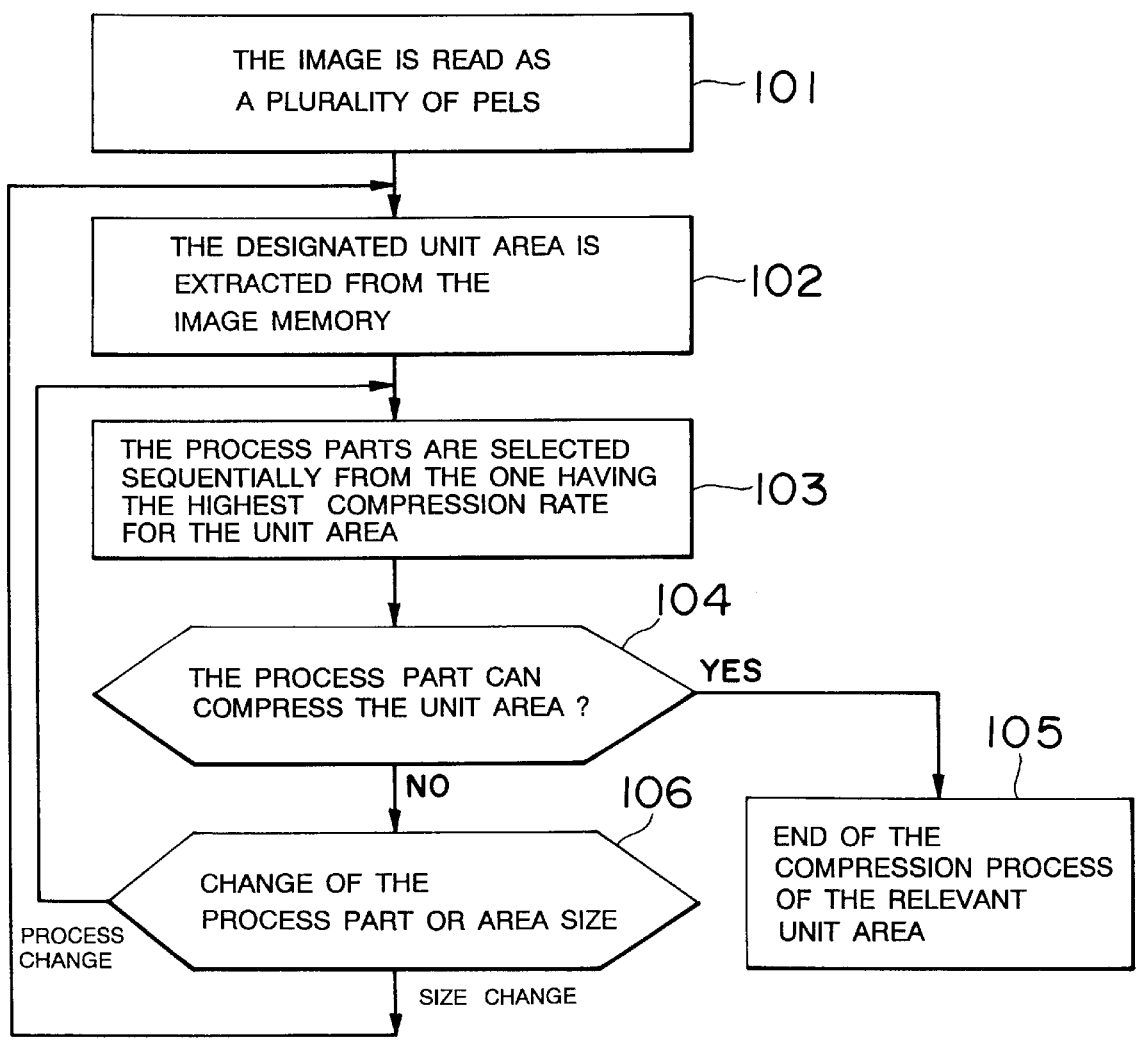
FIG. 13 is a flowchart showing an image compression method in accordance with the embodiment of this invention.

FIG. 13 is a flowchart of the image compression method. The image compression method will be explained in conjunction with FIG. 13. The color image scanner 11 sequentially takes in images of a plurality of frames. The color image analyzer 13 converts the respective frame images into items of RGB color datawhich are to be outputted to the image memory 15 (step 101).

Next, the area size setting unit 17 divides the image of each frame in the image memory 15 into a plurality of unit area with sizes indicated. Then, the area extraction unit 18 extracts each unit area (step 102).

Further, the compression process selection part 30a sequentially selects the process parts from those exhibiting higher compression rates in the compression process unit 20 (step 103). Judged subsequently is whether or not the process part having the high compression rate is capable of compressing the unit area of a designated size (step 104). Judged is whether or not each process part can compress the unit area on the basis of the results of the first and second comparing parts 19a, 19b described above.

Herein, if the relevant process part is incapable of compressing the unit area, the next action is to select a process part having the second highest compression rate to choose the second highest compression rate or to change the size of the unit area (step 106). Herein, whereas if the relevant process part is capable of compressing the unit area, the compression process of the unit area comes to an end (step 105).

On the other hand, when the compression process selection part 30a selects the process part having the second highest compression rate, this process part performs the action of step 104. Further, the area size change instruction part 30b instructs the area size setting unit 17 to change the indicted size to a smaller size. In this case, the actions of steps 102–104 are carried out.

FIG. 14 shows a detailed flow of selection process by the selection part 30. According to the selection process shown in FIG. 14, the process parts are chosen sequentially from those having the higher compression rates in different compression algorithms.

At the first onset, the compression process selection part 30a selects the monochrome process part 21. The area size setting unit 17 sets, e.g., 8 pels×8 pels as a size of the unit area to be extracted by the image extraction unit 18. Judged subsequently is whether or not the monochrome process part 21 is capable of expressing all the pels of the relevant unit area in one color (step 201). If the unit area defined by 8 pels×8 pels can be expressed in one color, the compression rate is set to 1/128. Then, the process of the relevant unit area is finished.

Next, if the monochrome process part 21 is incapable of expressing the (8×8) unit area in one color, the selection unit 30 judges whether that unit area is in the reference frame or not (step 202). If in the reference frame, the compression process selection part 30a selects the in-frame reference process part 22.

There is then Judged whether or not the in-frame reference process part 22 can compress a color of each pel of the unit area down to a color of each pel of other unit areas within the same frame (step 203). If the in-frame reference process part 22 is capable of compressing the unit area, this unit area undergoes the compression process. The process of the relevant unit area is thus ended.

Whereas if the in-frame reference process part 22 is incapable of compressing the relevant unit area, the action proceeds to step 205.

On the other hand, when the unit area is not in the reference frame in step 202, the compression process selection part 30a selects the inter-frame reference process part 23. Judged subsequently is whether or not the inter-frame reference process part 23 is capable of compressing a color of each pel of the relevant unit area down to a color of each pel of other in-frame unit areas (step 204).

If the inter-frame reference process part 23 is capable of compressing the relevant unit area, the relevant unit area is subjected to the compression process. The process of the relevant unit area is thus finished. Whereas if the inter-frame reference process part 23 is incapable of compressing the relevant unit area, the action proceeds to step 205.

The compression rate is set to 1/128 in the actions from steps 201 through 204. If incapable of compressing the relevant unit area by the actions thereof, the area size change instruction part 30b instructs the area size setting unit 17 to change the size of the unit area to a size of 8 pels×4 pels.

The (8×4) unit area is therefore extracted as done in the extraction process of step 102 shown in FIG. 13. Next, the compression process selection part 30a chooses the monochrome process part 21. Judged is whether or not the monochrome process part 21 is capable of compressing the (8×4) unit area (step 205). If this monochrome process part 21 can compress the relevant unit area, this unit area is compressed down to the monochrome. The process of the relevant unit area is thus finished.

Whereas if this monochrome process part 21 can not compress the relevant unit area, the area size change instruction part 30b instructs the area size setting unit 17 to change the size of the relevant unit area to a (4×8) size. There is then judged whether or not the monochrome process part 21 is capable of compressing the (4×8) unit area (step 206). If this monochrome process part 21 is capable of compressing the relevant unit area, this unit area is compressed down to the monochrome. The process of the relevant unit area is thus ended.

Whereas if the monochrome process part 21 is incapable of compressing the relevant unit area, the selection part 30 judges whether or not the relevant unit area is in the reference frame (step 207). If the relevant unit area is in the reference frame, the compression process selection part 30a selects the in-frame reference process part 22. Judged subsequently is whether or not the in-frame reference process part 22 is capable of compressing a color of each pel of the relevant unit area down to a color of each pel of other unit areas in the same frame (step 208). If the in-frame reference process part 22 can compress the relevant unit area, this unit area is subjected to the compression process. The process of the unit area thus comes to an end.

If the in-frame reference process part 22 can not compress the relevant unit area, the area size change instruction part 30b gives an instruction to change the unit area to the (4×8) size. Judged is whether or not the in-frame reference process part 22 is capable of compressing a color of each pel of the relevant are down to a color of each pel of other unit areas within the same frame (step 209).

If the in-frame reference process part 22 is capable of compressing the relevant unit area, this unit area is compressed. The process of the unit area is thus ended. Whereas if the in-frame reference process part 22 is incapable of compressing the relevant unit area, the action proceeds to step 212.

On the other hand, if it is judged in step 207 that the relevant unit area is not in the reference frame, the compression process selection part 30a selects the inter-frame reference process part 23. There is judged whether or not the inter-frame reference process part 23 is capable of compressing a color of each pel of the relevant unit area down to a color of each pel of other unit areas within other frames (step 210). If the inter-frame reference process part 23 is capable of compressing the relevant unit area, this unit area undergoes the compression process. The process of the relevant unit area is this ended.

Whereas if the inter-frame reference process part 23 is incapable of compressing the relevant unit area, the area size change instruction part 30b works to change the unit area to the (4×8) size. Judged is whether or not the inter-frame reference process part 23 is capable of compressing a color of each pel of the relevant unit area down to a color of each pel of other unit areas within other frames (step 211). If the inter-frame reference process part 23 is capable of compressing the relevant unit area, this unit area is compressed. The process of the unit ares comes to an end. Whereas if the inter-frame reference process part 23 is incapable of compressing the relevant unit area, the action proceeds to step 211.

The compression rate is set to 1/64 in the actions of steps 205 through 211. If the relevant area can not be compressed by the actions thereof, the area size change instruction part 30b instructs the area size setting unit 17 to change the unit area to a (4×4) size. Hence, the unit area of 4 pels×4 pels is extracted in step 102 shown in FIG. 13. Next, the compression process selection part 30a selects the monochrome process part 21. Whether the monochrome process part 21 is capable of compressing the (4×4) unit area is judged (step 212).

Hereinafter, similarly if the (4×4) unit area can be compressed by any of the in-frame reference process (step 214) and the inter-frame reference process (step 215), the process is finished. The compression rate is set to 1/32 in the actions of steps 212 through 215.

Next, if the relevant unit area can not be compressed by any of the process parts, the compression process selection part 30a selects the monochrome decoding process part 24. Judged is whether or not this process part is capable of compressing this unit area (step 216). If the process part 24 can compress the relevant unit area, the process of the relevant unit area is ended.

Whereas if the process part 24 can not compress the relevant unit area, the unit area is changed to a (4×2) size. Whether the monochrome process part 21 is capable of compressing the relevant unit area or not is judged (step 217). If capable of compressing this unit area, the process comes to an end.

Whereas if incapable of compressing the unit area, there is judged whether or not the relevant unit area can be compressed by the in-frame reference process (step 219) or the inter-frame reference process (step 220).

If the relevant unit area can not be compressed by these compression processes, whether the 4-color unit area process part 25 can perform the compression process or not is judged (step 221). If the relevant unit area can be compressed, the process is finished.

Whereas if the relevant unit area can not be compressed, the compression process selection part 30a selects a process part having a higher compression rate among the 8-color unit area process part 26, the complete subsampling process part 27 and the incomplete subsampling process part 28 (step 222). Then, the relevant unit area undergoes the compression process.

Finally, if not applied to any of the processes given above, this is conceived as an original with respect to the relevant unit area (step 224). The process then comes to an end.

Note that the processes shown in FIG. 14 are those for the single unit area within one frame, however, the selection part 30 effects those processes for all the unit areas existing within one frame.

As discussed above, in accordance with this embodiment, the plurality of frame images are taken in. The sizes are designated for the respective frame images, and each frame image is divided into the plurality of unit areas. The respective unit areas are then extracted. Then, there is judged whether or not the unit area with the designated size can be compressed by any of the process parts 21–28.

Herein, if the relevant unit area can be compressed by any of the process parts, the compression process is conducted by this process part. If the unit area with the designated size can not be compressed by any of the process parts, the designated size is changed to a smaller size. Subsequently, the judging process is repeated. One of the process parts compresses the unit area having the changed size.

Namely, the compression process is performed by the process part suited to the size required for compressing the pel contents of the relevant unit area. The image can be compressed by this compression process.

Further, the process parts 21–28 are selected sequentially from those exhibiting the higher image compression rates determined by the sizes of the unit areas. Judged then is whether or not the selected process part is capable of performing the compression process. The process part exhibiting the higher compression rate which is suited to the pel contents can compress the relevant unit area.

The contents of the respective unit areas thus compressed at the high compression rate are stored in the image memory 32. That is, the quantity of the color dataabout the pels within one frame is remarkably reduced and can be managed in the image memory 32.

It is apparent that, in this invention, a wide range of different working modes can be formed based on the invention without deviating from the spirit and scope of the invention. This invention is not restricted by its specific working modes except being limited by the appended claims.

What is claimed is:

1. An image compression method of compressing a 1-frame image consisting of a plurality of pels each having color data of red, green and blue down to less color data quantity, said method comprising:

inputting said 1-frame image included in a plurality of frame images;

setting a designated size for subdividing said 1-frame image;

extracting from said 1-frame image unit areas of said designated size;

effecting compression processes which differ from each other with respect to pels contained in each unit area;

selecting one compression process from said compression processes for compressing said unit areas of said designated size, having a compression rate of said color data quantity higher than other of said compression processes; and instructing said setting of said designated size to designate a smaller size to lower said compression rate if said compression processes can not be performed at all for said unit areas of said designated size, wherein said compression processes include monochrome processing by converting all colors of said pels contained in each unit area within said 1-frame image into a unit area representative color, in-frame reference processing by converting an original color of each pel contained in non-reference unit areas within said 1-frame image into an in-frame reference color of a corresponding pel contained in an in-frame unit area within said 1-frame image, and inter-frame reference processing by converting the original color of each pel contained in each unit area within said 1-frame image into an inter-frame reference color of a corresponding pel contained in an inter-frame unit area within another of said frame images.

2. The image compression method as set forth in claim 1, wherein said selection step is to perform said selecting process for said each unit area extracted in said extraction step.

3. The image compression method as set forth in claim 1, further comprising:

a first comparing step of comparing colors of corresponding pels with each other in each unit area and one of said in-frame and inter-frame unit areas; and a second comparing step of comparing said unit area representative color with a predetermined color reference value.

4. The image compression method as set forth in claim 3, wherein at least one of said in-frame and inter-frame reference processing steps are used if a color difference between said corresponding pels in each unit area and the one of said in-frame unit and inter-frame unit areas falls within a predetermined value in said first comparing step.

5. The image compression method as set forth in claim 3, wherein said monochrome processing step is used if said unit area representative color matches said predetermined color reference value.

6. The image compression method as set forth in claim 1, wherein said plurality of compression processes further include a multi-color unit area processing equally subdividing each unit area containing said plurality of pels into equally subdivided unit areas and converting said equally subdivided unit areas to assume different colors, and a monochrome decode processing unequally subdividing each unit area containing said plurality of pels into unequally subdivided unit areas and converting said unequally subdivided unit areas to assume one color, and wherein said selecting preferentially selects the one compression process exhibiting the image compression rate higher than other of said compression processes from said compression processes including said multi-color unit area processing and said monochrome decode processing.

7. The image compression method as set forth in claim 1, wherein said plurality of compression processing steps further include a first subsampling step of deleting said pels at a fixed interval among said pels of said unit area and a second subsampling step of extracting a subdivided unit area with no sharp color variation of said pel from said unit area and deleting some of said pels of said subdivided unit area, and said selection step is to preferentially select said step exhibiting a higher image compression rate from said steps including said first and second subsampling steps with respect to said unit area.

8. An image processing system for compressing a 1-frame image consisting of a plurality of pels each having color data of red, green and blue down to less color data quantity, comprising:

an image input unit for inputting frame images, including said 1-frame image;

an extraction unit for setting a designated size for subdividing said 1-frame image and for extracting from said 1-frame image unit areas of said designated size;

a compression processing unit for effecting compression processes which differ from each other with respect to pels contained in each unit area;

a selection unit for selecting one compression process from said compression processes for compressing said unit areas of said designated size, having a compression rate of said color data quantity higher than other of said compression processes; and an area change instruction unit for instructing said extraction unit to change said designated size to a smaller size to lower said compression rate if said compression processes can not be performed at all for said unit areas of said designated size, and wherein said compression processes include monochrome processing by converting all colors of said pels contained in each unit area within said 1-frame image into a unit area representative color, in-frame reference processing by converting an original color of each pel contained in non-reference unit areas within said 1-frame image into an in-frame reference color of a corresponding pel contained in an in-frame unit area within said 1-frame image, and inter-frame reference processing by converting the original color of each pel contained in each unit area within said 1-frame image into an inter-frame reference color of a corresponding pel contained in an inter-frame unit area within another of said frame images.

9. The image processing system as set forth in claim 8, wherein said selection unit selects each unit area extracted by said extraction unit.

10. The image processing system as set forth in claim 8, further comprising:
   a first comparing unit for comparing colors of corresponding pels with each other in each unit area and said in-frame and inter-frame unit areas; and
   a second comparing unit for comparing said unit area representative color with a predetermined color reference value.

11. The image processing system as set forth in claim 10, wherein at least one of said in-frame and inter-frame reference processing are used if a color difference between said corresponding pels in each unit area and said in-frame and inter-frame unit areas, respectively, falls within a predetermined value.

12. The image processing system as set forth in claim 10, wherein said monochrome processing is used if said unit area representative color matches said predetermined color reference value.

13. The image processing system as set forth in claim 8, wherein said plurality of compression processes further include
   multi-color unit area processing equally subdividing each unit area containing said plurality of pels into equally subdivided unit areas and for converting said equally subdivided unit areas to assume different colors, and
   monochrome decode processing unequally subdividing each unit area containing said plurality of pels into unequally subdivided unit areas and for converting said unequally subdivided unit areas to assume one color, and
   wherein said selecting unit preferentially selects the one compression process exhibiting the image compression rate higher than other of said compression processes from said compression processes including said multi-color unit area processing and said monochrome decode processing.

14. The image processing system as set forth in claim 8, wherein said plurality of compression processes further include a first subsampling process for deleting said pels at a fixed interval among said pels of each unit area and a second subsampling process for extracting a subdivided unit area with no sharp color variation of said pels in each unit area and for deleting some of said pels of said subdivided unit area, and
   wherein said selection unit preferentially selects said one compression process exhibiting a higher image compression rate from said compression processes, including said first and second subsampling processes, with respect to each unit area.

15. An image compression method of compressing a 1-frame image consisting of a plurality of pels each having color data of red, green and blue down to less color data quantity, said method comprising:
   inputting said 1-frame image included in a plurality of frame images;
   extracting from said 1-frame image unit areas of a designated size;
   effecting compression processes which differ from each other with respect to pels contained in each unit area; and
   selecting one compression process of said compression processes for compressing said unit areas of said designated size, wherein said processes include monochrome processing by converting all colors of said pels contained in each unit area within said 1-frame image into a unit area representative color, in-frame reference processing by converting an original color of each pel contained in non-reference unit areas within said 1-frame image into an in-frame reference color of a corresponding pel contained in an in-frame unit area within said 1-frame image, and inter-frame reference processing by converting the original color of each pel contained in each unit area within said 1-frame image into an inter-frame reference color of a corresponding pel contained in an inter-frame unit area within another of said frame images.

16. A method of compressing image data representing frames of pels by reducing colors used by the pels, comprising:
   selecting a unit area size for processing unit areas in each frame;
   selecting a compression process having highest compression from among
      a monochrome process of converting a color of each pel contained in each unit area within a current frame into a unit area representative color when the color of each pel in the unit area differs from the unit area representative color by no more than a first reference value,
      an in-frame reference process of converting a non-reference color of each pel contained in non-reference unit areas within the current frame into an in-frame reference color of a corresponding pel contained in an in-frame reference unit area within the current frame when the non-reference color and the in-frame reference color differ by no more than a second reference value, and
      an inter-frame reference process of converting the non-reference color of each pel contained in each unit area within all non-reference frames into an inter-frame reference color of a corresponding pel contained in an inter-frame reference unit area within a reference frame when the non-reference color and the inter-frame reference color differ by no more than a third reference value;
   repeating said selecting of the unit area size and the compression process using a smaller unit area when none of the monochrome, in-frame reference and inter-frame reference processes can be performed; and
   processing each unit area of the current frame using the unit area size selected and the compression process selected.

17. A storage medium storing a computer program for a computer to compress a 1-frame image consisting of a plurality of pels each having color data of red, green and blue down to less color data quantity, comprising:
   an input segment to input the 1-frame image included in a plurality of frame images;
   a size setting segment to set a designated size for subdividing the 1-frame image;
   an extraction segment to extract from the 1-frame image unit areas of the designated size;
   at least one compression segment to perform compression processes which differ from each other with respect to pels contained in each unit area, the compression processes including
      monochrome processing to convert all colors of the pels contained in each unit area within the 1-frame image into a unit area representative color, in-frame reference processing to convert an original color of each pel contained in non-reference unit areas within the 1-frame image into an in-frame reference color of a corresponding pel contained in an in-frame unit area within the 1-frame image, and
inter-frame reference processing to convert the original color of each pel contained in each unit area within the 1-frame image into an inter-frame reference color of a corresponding pel contained in an inter-frame unit area within another of the frame images;

a selection segment to select one compression process from the compression processes to compress the unit areas of the designated size, having a compression rate of the color data quantity higher than other of the compression processes; and a size reduction segment to designate a smaller size to lower the compression rate if the compression processes cannot be performed at all for the unit areas of the designated size.

18. A storage medium storing a computer program for a computer to compress a 1-frame image consisting of a plurality of pels each having color data of red, green and blue down to less color data quantity, comprising:

an input segment to input the 1-frame image included in a plurality of frame images;

an extraction segment to extract from the 1-frame image unit areas of a designated size;

at least one compression segment to perform compression processes which differ from each other with respect to pels contained in each unit area, the compression processes including monochrome processing to convert all colors of the pels contained in each unit area within the 1-frame image into a unit area representative color, in-frame reference processing to convert an original color of each pel contained in non-reference unit areas within the 1-frame image into an in-frame reference color of a corresponding pel contained in an in-frame unit area within the 1-frame image, and inter-frame reference processing to convert the original color of each pel contained in each unit area within the 1-frame image into an inter-frame reference color of a corresponding pel contained in an inter-frame unit area within another of the frame images; and a selection segment to select one compression process of the compression processes to compress the unit areas of the designated size.

19. A storage medium storing a computer program for a computer to compress image data representing frames of pels by reducing colors used by the pels, comprising:

a size selection segment to select a unit area size for processing unit areas in each frame;

a process selection segment to select a compression process having highest compression from among a monochrome process of converting a color of each pel contained in each unit area within a current frame into a unit area representative color when the color of each pel in the unit area differs from the unit area representative color by no more than a first reference value, an in-frame reference process of converting a non-reference color of each pel contained in non-reference unit areas within the current frame into an in-frame reference color of a corresponding pel contained in an in-frame reference unit area within the current frame when the non-reference color and the in-frame reference color differ by no more than a second reference value, and an inter-frame reference process of converting the non-reference color of each pel contained in each unit area within all non-reference frames into an inter-frame reference color of a corresponding pel contained in an inter-frame reference unit area within a reference frame when the non-reference color and the inter-frame reference color differ by no more than a third reference value;

a resizing segment to repeat execution of said size and process selection segments using a smaller unit area when none of the monochrome, in-frame reference and inter-frame reference processes can be performed; and a process segment to process each unit area of the current frame using the unit area size selected and the compression process selected.

* * * * *

UNITED STATES PATENT AND TRADEMARK OFFICE
CERTIFICATE OF CORRECTION

PATENT NO.: 5,898,794
DATED : April 27, 1999
INVENTOR(S): Satoshi SONOHARA et al.

It is certified that error appears in the above-identified patent and that said Letters Patent is hereby corrected as shown below:

Title Page:

Assignee [73]: change "Kanagawa" to --Kawasaki--.

Column 13, line 61, change "a" to --said--.

Signed and Sealed this

Eleventh Day of January, 2000

*Attest:*

Q. TODD DICKINSON

*Attesting Officer*     *Acting Commissioner of Patents and Trademarks*